United States Patent
Tsuboi et al.

(10) Patent No.: US 9,686,065 B2
(45) Date of Patent: Jun. 20, 2017

(54) COMMUNICATION SYSTEM, BASE STATION APPARATUS, MOBILE STATION APPARATUS, MEASUREMENT METHOD, AND INTEGRATED CIRCUIT

(71) Applicant: SHARP KABUSHIKI KAISHA, Osaka-shi, Osaka (JP)

(72) Inventors: Hidekazu Tsuboi, Osaka (JP); Katsunari Uemura, Osaka (JP); Daiichiro Nakashima, Osaka (JP); Wataru Ouchi, Osaka (JP); Kimihiko Imamura, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 5 days.

(21) Appl. No.: 14/402,600

(22) PCT Filed: May 16, 2013

(86) PCT No.: PCT/JP2013/063624
§ 371 (c)(1),
(2) Date: Nov. 20, 2014

(87) PCT Pub. No.: WO2013/176027
PCT Pub. Date: Nov. 28, 2013

(65) Prior Publication Data
US 2015/0139005 A1   May 21, 2015

(30) Foreign Application Priority Data

May 23, 2012 (JP) ................................ 2012-117048

(51) Int. Cl.
*H04L 5/00* (2006.01)
*H04W 72/04* (2009.01)
(Continued)

(52) U.S. Cl.
CPC .......... *H04L 5/0051* (2013.01); *H04L 1/0026* (2013.01); *H04L 5/0053* (2013.01);
(Continued)

(58) Field of Classification Search
None
See application file for complete search history.

(56) References Cited

U.S. PATENT DOCUMENTS

2006/0205415 A1   9/2006 Rezaiifar et al.
2011/0195708 A1*  8/2011 Moberg ............ H04W 36/0094
                                                 455/424

(Continued)

FOREIGN PATENT DOCUMENTS

JP    2008-536358 A    9/2008
JP    WO 2011136290 A1 * 11/2011  ........ H04W 36/0083

OTHER PUBLICATIONS

R2-121646, "Measurement Configuration for CSI-RS Based Measurement for CoMP", 3GPP TSG-RAN WG2 Meeting #77bis, Jeju, Korea, Mar. 26-30, 2012.*

(Continued)

*Primary Examiner* — Faruk Hamza
*Assistant Examiner* — Cassandra Decker
(74) *Attorney, Agent, or Firm* — Birch, Stewart, Kolasch & Birch, LLP

(57) ABSTRACT

A base station apparatus configures, for each of configurations for channel state information reference signals included in a measurement configuration, a measurement offset to offset a result of measurement using the channel state information reference signal, based on the purpose of measurement. A mobile station apparatus adds the corresponding measurement offset included in the measurement configuration to a result of measuring each of the channel (Continued)

state information reference signals and judges whether a condition of a report configuration is satisfied.

8 Claims, 6 Drawing Sheets

(51) Int. Cl.
*H04W 24/08* (2009.01)
*H04L 1/00* (2006.01)

(52) U.S. Cl.
CPC ....... *H04W 24/08* (2013.01); *H04W 72/0413* (2013.01); *H04L 5/0035* (2013.01); *H04L 5/0048* (2013.01); *H04L 5/0057* (2013.01)

(56) References Cited

U.S. PATENT DOCUMENTS

| | | | | |
|---|---|---|---|---|
| 2013/0003788 A1* | 1/2013 | Marinier | ................ | H04B 7/024 375/219 |
| 2013/0077513 A1* | 3/2013 | Ng | ................ | H04B 7/024 370/252 |
| 2013/0100838 A1* | 4/2013 | Iwamura | ................ | H04W 36/30 370/252 |
| 2013/0242787 A1* | 9/2013 | Sun | ................ | H04L 43/06 370/252 |
| 2013/0303090 A1* | 11/2013 | Hammarwall | ....... | H04B 7/0456 455/67.13 |

OTHER PUBLICATIONS

Ericsson et al., "Measurement Framework Based on CSI-RS", 3GPP TSG-RAN WG2 #78, R2-122529, May 15, 2012.
Huawei et al., "General Framework and Principles for Configuration of CSI-RS Based Received Signal Quality Measurement", 3GPP TSG-RAN WG2 Meeting #78, R2-122135, May 15, 2012.
Samsung, "Discussion on CoMP Resource Management Procedure", 3GPP TSG-RAN WG2 #78, RS-122739, May 14, 2012.
Ericsson et al., "Interference Measurements for CoMP CSI Reporting," 3GPP TSG-RAN WG1 #69, R1-122840, Prague, Czech Republic, May 21-30, 2012, 4 pages.
3GPP TS 36.331 V10.5.0 (Mar. 2012), Radio Resource Control (RRC); Protocol Specification, (Release 10), pp. 1-302, (http://www.3gpp.org/ftp/Specs/html-info/36331.htm).
3GPP TSG-RAN WG1 #69, R1-122842, Ericsson, ST-Ericsson, Dimensioning of the CoMP Resource Management Set (http://www.3gpp.org/ftp/tsg_ran/WG1_RL1/TSGR1_69/Docs/R1-122842.zip).

* cited by examiner

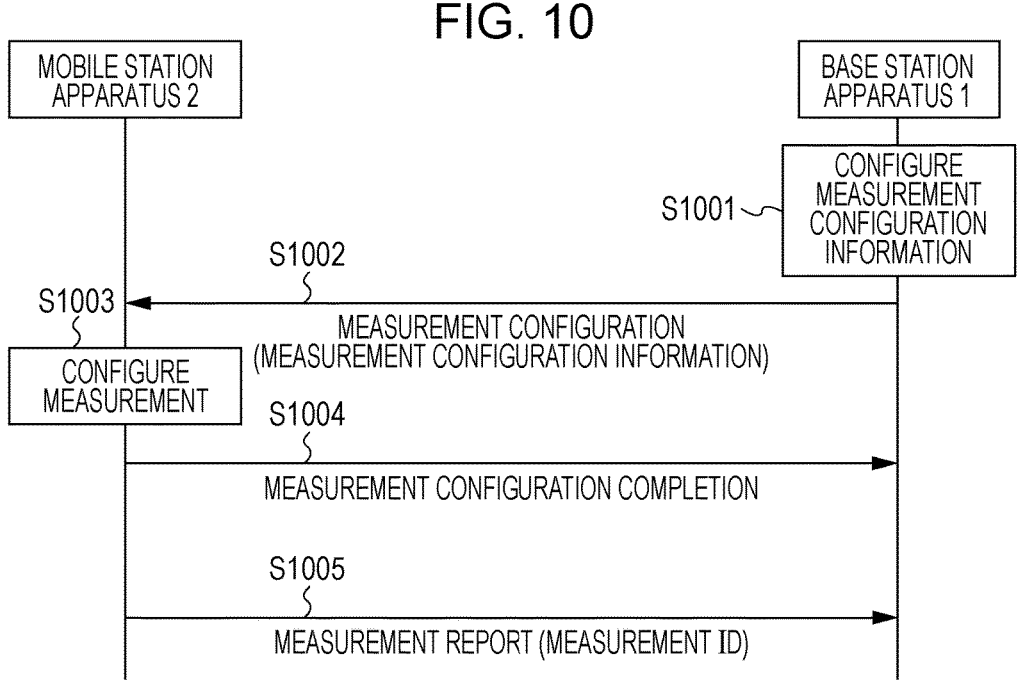
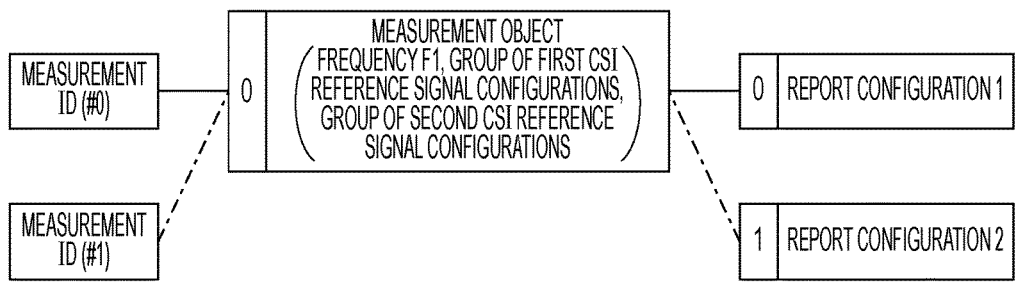
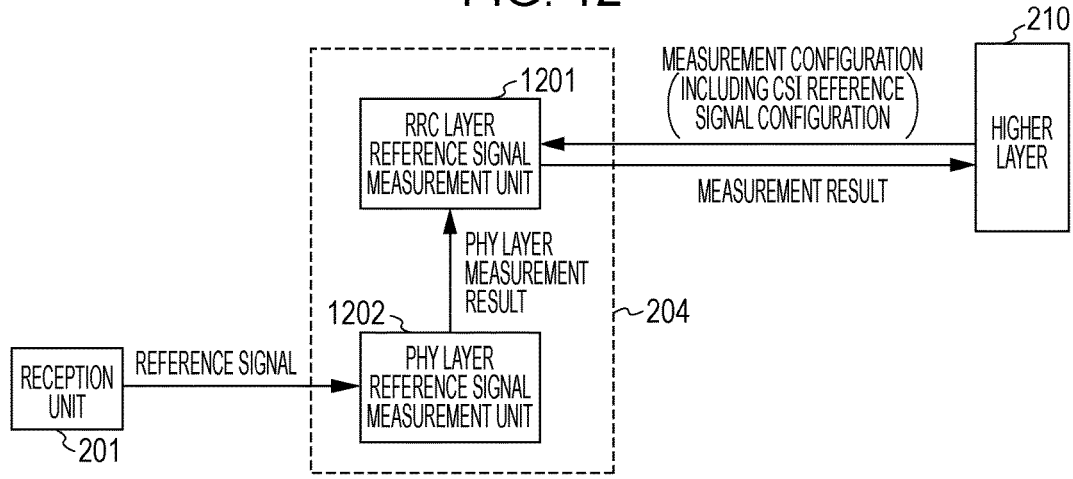

COMMUNICATION SYSTEM, BASE STATION APPARATUS, MOBILE STATION APPARATUS, MEASUREMENT METHOD, AND INTEGRATED CIRCUIT

TECHNICAL FIELD

The present invention relates to a communication system, a base station apparatus, a mobile station apparatus, a measurement method, and an integrated circuit, and particularly relates to a communication system in which a mobile station apparatus measures a received signal based on configurations, of which the mobile station apparatus is notified by a base station apparatus.

BACKGROUND ART

Radio access system and radio network evolution in cellular mobile communication (hereinafter referred to as "long term evolution (LTE)" or "evolved universal terrestrial radio access (EUTRA)") is considered in the 3rd Generation Partnership Project (3GPP), and LTE-Advanced (also referred to as LTE-A or "Advanced EUTRA)"), which is a developed version to adopt a new technique, is also considered.

In Advanced EUTRA, in order to reduce or suppress interference with a mobile station apparatus or in order to increase received signal power, intercell coordinated (cooperative multipoint (CoMP)) communication to carry out communication between adjacent cells in coordination with each other, is considered. For example, a method for transmitting signals, subjected to different weighting signal processes (precoding processes) in a plurality of cells, to a signal mobile station apparatus in coordination with each other by a plurality of base station apparatuses (also referred to as joint processing (JP) or joint transmission (JT)), a method for scheduling a mobile station apparatus through coordination among a plurality of cells (coordinated scheduling (CS)), a method for transmitting a signal to a mobile station apparatus using beamforming through coordination among a plurality of cells (coordinated beamforming (CB)), and a method for transmitting a signal using a predetermined resource only by one cell and not transmitting a signal using a resource overlapping the resource by another cell (blanking or muting) are considered as examples of the intercell coordinated communication.

Note that a plurality of cells used for intercell coordinated communication may be cells managed by different base station apparatuses or may be cells managed by a single base station apparatus. Each cell may be composed of a radio unit (also referred to as a remote radio head (RRH) or a remote radio unit (RRU)) controlled by a control unit of a base station apparatus main body. The radio unit may be connected to the base station apparatus main body with a wire, such as an optical fiber, or may be connected wirelessly, as in a relay station apparatus.

CITATION LIST

Non Patent Literature

NPL 1: R2-122842, Dimensioning of the CoMP Resource Management Set (http://www.3gpp.org/ftp/tsg_ran/WG1_RL1/TSGR1_69/Docs/R1-122842.zip)

NPL 2: 3GPP TS36.331, Radio Resource Control (RRC); Protocol specification. V10.5.0 (http://www.3gpp.org/ftp/Specs/html-info/36331.htm)

SUMMARY OF INVENTION

Technical Problem

In 3GPP, to receive a channel state information reference symbol (CSI-RS) transmitted from one or more cells which are candidates to carry out intercell coordinated communication and carry out measurement of received quality in order to optimize a cell carrying out the intercell coordinated communication is considered in the discussions on Advanced EUTRA.

NPL 1 proposes notifying a mobile station apparatus of a plurality of channel state information reference signals (CSI reference signals) as objects of measurement, and measuring reference signal received power values of the channel state information reference signals, of which the mobile station apparatus is notified, and reporting top N ones of the reference signal received power values to a base station apparatus by the mobile station apparatus.

However, efficient intercell coordinated communication may be unfeasible only by reporting top N ones of reference signal received power values, as in NPL 1. For example, at the time of unlink intercell coordinated communication, intercell coordinated communication is desirably carried out using a cell located near a mobile station apparatus. If the cell located near the mobile station apparatus is an RRH or the like with low transmission power, a measurement result for a macrocell with high transmission power may be preferentially reported, and a measurement result for the RRH may not be reported.

The present invention has been made in view of the problems above, and it is an object thereof to provide a communication system, a base station apparatus, a mobile station apparatus, a measurement method, and an integrated circuit that are capable of carrying out channel state information reference signal measurements corresponding to different purposes, such as uplink and downlink intercell coordinated communication.

Solution to Problem (1) In order to achieve the above object, the present invention has taken measures as follows. That is, a communication system of the present application is a communication system in which a base station apparatus notifies a mobile station apparatus of a measurement configuration specifying measurement using a reference signal, wherein the measurement configuration includes a measurement object indicating at least a frequency serving as an object to be measured and respective configurations for one or more channel state information reference signals to be measured, and a report configuration specifying a condition for a measurement report, the base station apparatus includes, for each of configurations for channel state information reference signals, a measurement offset to offset a result of measurement using the channel state information reference signal in the measurement configuration and notifies the mobile station apparatus of the measurement configuration, and the mobile station apparatus adds the corresponding measurement offset to a result of measuring each of the channel state information reference signals to judge whether a condition of a report configuration is satisfied.

(2) A communication system of the present application is a communication system in which a base station apparatus notifies a mobile station apparatus of a measurement configuration specifying measurement using a reference signal, wherein the measurement configuration includes a measurement object indicating at least a frequency serving as an object to be measured and respective configurations for one or more channel state information reference signals to be measured, and a report configuration specifying a condition for a measurement report, the base station apparatus classifies the configurations for the one or more channel state information reference signals into one or more groups and includes information, which allows identification of one among the groups, in the measurement configuration to notify the mobile station apparatus of the measurement configuration, and the mobile station apparatus carries out measurement using a channel state information reference signal of the group associated with a report configuration.

(3) A base station apparatus of the present application is a base station apparatus for notifying a mobile station apparatus of a measurement configuration specifying measurement using a reference signal, wherein the measurement configuration includes a measurement object indicating at least a frequency serving as an object to be measured and respective configurations for one or more channel state information reference signals to be measured, and a report configuration specifying a condition for a measurement report, and the base station apparatus includes, for each of configurations for channel state information reference signals, a measurement offset to offset a result of measurement using the channel state information reference signal in the measurement configuration and notifies the mobile station apparatus of the measurement configuration.

(4) A base station apparatus of the present application is a base station apparatus for notifying a mobile station apparatus of a measurement configuration specifying measurement using a reference signal, wherein the measurement configuration includes a measurement object indicating at least a frequency serving as an object to be measured and respective configurations for one or more channel state information reference signals to be measured, and a report configuration specifying a condition for a measurement report, and the base station apparatus classifies the configurations for the one or more channel state information reference signals into one or more groups and includes information, which allows identification of one among the groups, in the measurement configuration to notify the mobile station apparatus of the measurement configuration.

(5) A mobile station apparatus of the present application is a mobile station apparatus for receiving, from a base station apparatus, a measurement configuration specifying measurement using a reference signal, wherein the measurement configuration includes a measurement object indicating at least a frequency serving as an object to be measured and respective configurations for one or more channel state information reference signals to be measured, and a report configuration specifying a condition for a measurement report, the measurement configuration further includes, for each of configurations for channel state information reference signals, a measurement offset to offset a result of measurement using the channel state information reference signal, and the mobile station apparatus adds the corresponding measurement offset to a result of measuring each of the channel state information reference signals to judge whether a condition of a report configuration is satisfied.

(6) A mobile station apparatus of the present application is a mobile station apparatus for receiving, from a base station apparatus, a measurement configuration specifying measurement using a reference signal, wherein the measurement configuration includes a measurement object indicating at least a frequency serving as an object to be measured and respective configurations for one or more channel state information reference signals to be measured, and a report configuration specifying a condition for a measurement report, the measurement configuration further has one or more groups, into which the configurations for the one or more channel state information reference signals are classified, and includes information, which allows identification of one among the groups, and the mobile station apparatus carries out measurement using a channel state information reference signal of the group associated with a report configuration.

(7) A measurement method of the present application is a measurement method for a mobile station apparatus to receive, from a base station apparatus, a measurement configuration specifying measurement using a reference signal, wherein the measurement configuration includes a measurement object indicating at least a frequency serving as an object to be measured and respective configurations for one or more channel state information reference signals to be measured, and a report configuration specifying a condition for a measurement report, the measurement configuration further includes, for each of configurations for channel state information reference signals, a measurement offset to offset a result of measurement using the channel state information reference signal, and the measurement method includes the step of adding the corresponding measurement offset to a result of measuring each of the channel state information reference signals and judging whether a condition of a report configuration is satisfied.

(8) A measurement method of the present application is a measurement method for a mobile station apparatus to receive, from a base station apparatus, a measurement configuration specifying measurement using a reference signal, wherein the measurement configuration includes a measurement object indicating at least a frequency serving as an object to be measured and respective configurations for one or more channel state information reference signals to be measured, and a report configuration specifying a condition for a measurement report, the measurement configuration further has one or more groups, into which the configurations for the one or more channel state information reference signals are classified, and includes information, which allows identification of one among the groups, and the measurement method includes the step of carrying out measurement using a channel state information reference signal of the group associated with a report configuration.

(9) An integrated circuit of the present application is an integrated circuit to be mounted in a mobile station apparatus to receive, from a base station apparatus, a measurement configuration specifying measurement using a reference signal, wherein the measurement configuration includes a measurement object indicating at least a frequency serving as an object to be measured and respective configurations for one or more channel state information reference signals to be measured, and a report configuration specifying a condition for a measurement report, the measurement configuration further includes, for each of configurations for channel state information reference signals, a measurement offset to offset a result of measurement using the channel state information reference signal, and the integrated circuit includes a function of adding the corresponding measurement offset to a result of measuring each of the channel state information reference signals and judging whether a condition of a report configuration is satisfied.

(10) An integrated circuit of the present application is an integrated circuit to be mounted in a mobile station apparatus to receive, from a base station apparatus, a measurement configuration specifying measurement using a reference signal, wherein the measurement configuration includes a measurement object indicating at least a frequency serving as an object to be measured and respective configurations for one or more channel state information reference signals to be measured, and a report configuration specifying a condition for a measurement report, the measurement configuration further has one or more groups, into which the configurations for the one or more channel state information reference signals are classified, and includes information, which allows identification of one among the groups, and the integrated circuit includes a function of carrying out measurement using a channel state information reference signal of the group associated with a report configuration.

Advantageous Effects of Invention

According to the present invention, it is possible to provide a communication system, a base station apparatus, a mobile station apparatus, a measurement method, and an integrated circuit that are capable of carrying out channel state information reference signal measurements corresponding to different purposes, such as uplink and downlink intercell coordinated communication.

BRIEF DESCRIPTION OF DRAWINGS

FIG. 10 is a flowchart showing one example of a measurement configuration procedure in the second embodiment of the present invention.

FIG. 11 is a diagram showing one example of a measurement configuration in a third embodiment of the present invention.

FIG. 12 is a block diagram showing one example of a measurement unit of a mobile station apparatus in the third embodiment of the present invention.

DESCRIPTION OF EMBODIMENTS

Figure 1:
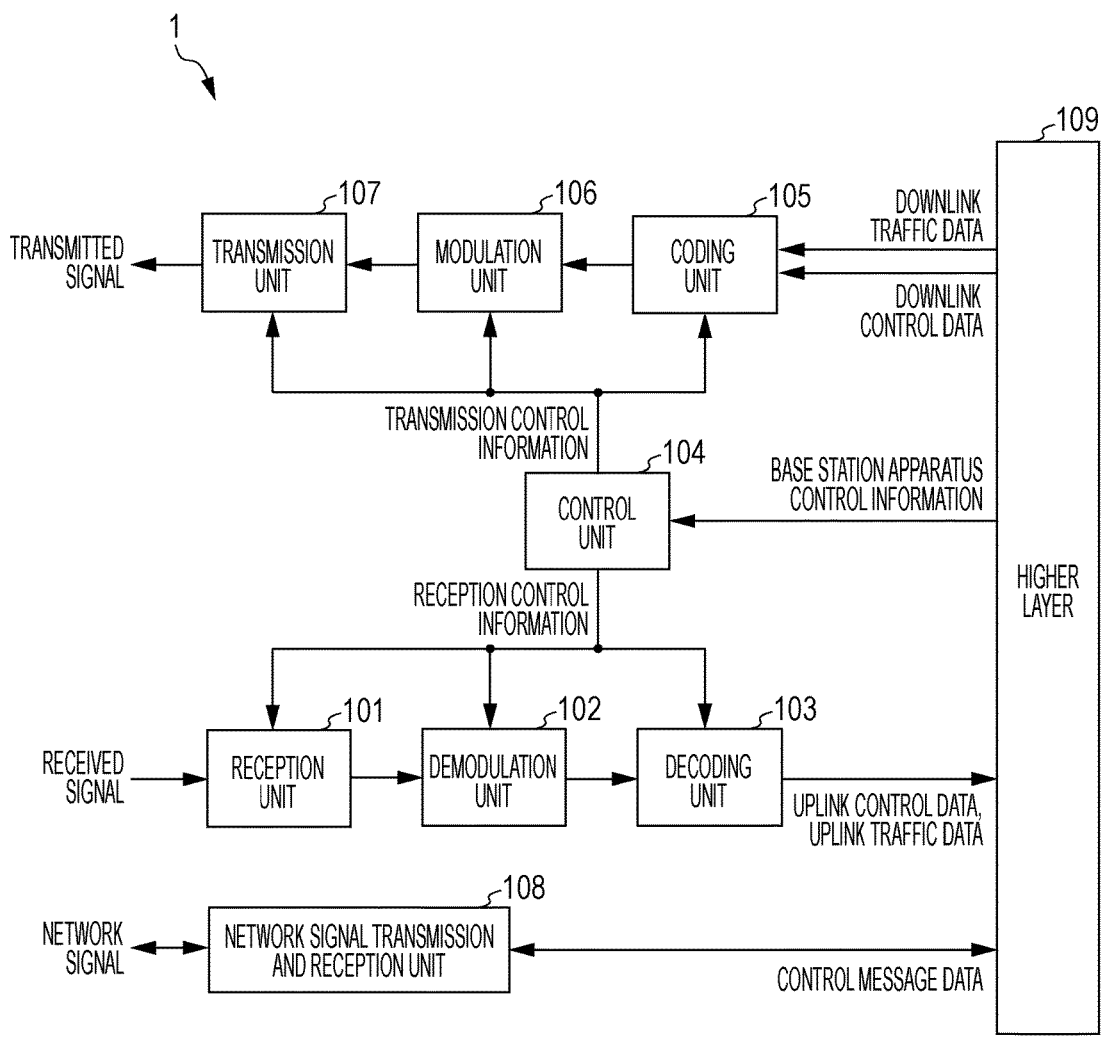
FIG. 1 is a block diagram showing one example of a base station apparatus according to an embodiment of the present invention.

Before describing each embodiment of the present invention, techniques related to the embodiments of the present invention will be briefly described.

[Physical Channel]

Principal physical channels (or physical signals) used in EUTRA and Advanced EUTRA will be described. A channel means a medium used for transmission of a signal, and a physical channel means a physical medium used for transmission of a signal. Although there is a possibility of adding a physical channel or altering or adding an architecture and a format thereof in EUTRA and Advanced EUTRA in the future, even a change or an alteration does not affect the descriptions of the embodiments of the present invention.

In EUTRA and Advanced EUTRA, scheduling of a physical channel is managed using radio frames. One radio frame is 10 ms, and one radio frame is composed of 10 subframes. One subframe is composed of two slots (that is, one slot is 0.5 ms). Additionally, scheduling to arrange a physical channel is managed using a resource block as a smallest unit. A resource block is defined by a fixed frequency domain composed of a set of a plurality of subcarriers (for example, 12 subcarriers) along a frequency axis and a region composed of a fixed transmission time interval (one slot).

Synchronization signals are composed of three types of primary synchronization signals and secondary synchronization signals, each composed of 31 types of codes, which are arranged alternately in the frequency domain. Signal combinations of the primary synchronization signals and the secondary synchronization signals present 504 cell identifiers (physical cell IDs (physical cell identities; PCIs) to identify a base station apparatus and the frame timing for radio synchronization. A mobile station apparatus identifies the cell ID of a synchronization signal received through a cell search.

Transmission through a physical broadcast channel (PBCH) is carried out for the purpose of providing notification of control parameters (broadcast information and system information) to be shared by mobile station apparatuses in a cell. As for broadcast information, notification of which is not provided through a physical broadcast channel, notification of a radio resource is provided through a physical downlink control channel, and the broadcast information is transmitted in a layer 3 message (system information) through a physical downlink shared channel. Examples of broadcast information, notification of which is provided, include a cell global identifier (CGI) indicating the identifier of an individual cell, a tracking area identifier (TAI) for managing a standby area through paging, random access configuration information (for example, a transmission timing timer), and common radio resource configuration information.

Downlink reference signals are classified into a plurality of types depending on the use. For example, cell-specific reference signals (CRSs) are each a pilot signal transmitted at predetermined power for each cell and a downlink reference signal periodically repeated in the frequency domain and in the time domain based on predetermined rules. A mobile station apparatus measures received quality for each cell by receiving a cell-specific reference signal. Additionally, a mobile station apparatus uses a downlink cell-specific reference signal also as a signal of reference for demodulation of a physical downlink control channel or a physical downlink shared channel which is transmitted simultaneously with a cell-specific reference signal. As a sequence used for a cell-specific reference signal, an identifiable sequence is used for each cell.

A downlink reference signal is also used for estimation of downlink channel variation. Downlink reference signals used for estimation of channel variation are referred to as channel state information reference signals (CSI-RSs) or CSI reference signals. Additionally, downlink reference signals individually configured for respective mobile station apparatuses are referred to as UE specific reference signals (URSs) or dedicated RSs (DRSs) and used for demodulation of a physical downlink control channel or a physical downlink shared channel.

A physical downlink control channel (PDCCH) is transmitted in first several OFDM symbols of each subframe and used for the purpose of giving, to a mobile station apparatus, information on allocation of radio resources in accordance with scheduling of a base station apparatus and an amount by which transmission power is adjusted so as to increase or decrease. By watching for (monitoring) a physical downlink control channel addressed to a mobile station itself before transmitting and receiving downlink data and a layer 3 message (for example, a paging or handover command) which is downlink control data to receive the physical downlink control channel addressed to the mobile station itself, a mobile station apparatus needs to obtain information on allocation of radio resources, called an uplink grant at the time of transmission or a downlink grant (downlink assignment) at the time of receipt, from a physical downlink control channel. Note that it is also possible to configure a physical downlink control channel to be transmitted in a region as a resource block allocated in a dedicated manner to a mobile station apparatus by a base station apparatus instead of being transmitted in the ODFM symbols described above.

A physical uplink control channel (PUCCH) is used to provide notification of a reception acknowledgement response (acknowledgement/negative acknowledgement (ACK/NACK)) of data transmitted through a physical downlink shared channel and downlink channel state information and make a scheduling request (SR), which is an uplink radio resource allocation request (radio resource request). Channel state information (CSI) includes a channel quality indicator (CQI), a precoding matrix indicator (PMI), a precoding type indicator (PTI), and a rank indicator (RI). Although the word indicator in each term may be replaced with the word indication, the use and the meaning of the term remain unchanged.

A physical downlink shared channel (PDSCH) is not only used for downlink data, but also used for notifying a mobile station apparatus of paging and broadcast information (system information), notification of which is not provided through a physical broadcast information channel, as a layer 3 message. Information on allocation of radio resources on a physical downlink shared channel is given by a physical downlink control channel.

A physical uplink shared channel (PUSCH) mainly transmits uplink data and uplink control data and can also include downlink received quality and control data, such as ACK/NACK. The physical uplink shared channel is also used for notifying a base station apparatus of uplink control information as a layer 3 message as well as uplink data. As in the case of downlink, information on allocation of radio resources on a physical uplink shared channel is given by a physical downlink control channel.

Uplink reference signals (also referred to as uplink pilot signals or uplink pilot channels) include a demodulation reference signal (DMRS) used by a base station apparatus to demodulate a physical uplink control channel PUCCH and/or a physical uplink shared channel PUSCH and a sounding reference signal (SRS) used by a base station apparatus mainly to estimate an uplink channel state. Sounding reference signals include a periodic sounding reference signal (periodic SRS) and an aperiodic sounding reference signal (aperiodic SRS).

A physical random access channel (PRACH) is a channel used for notification of a preamble sequence and has a guard time. As the preamble sequence, 64 types of sequences are available to represent 6-bit information. A physical random access channel is used as a means of gaining access to a base station apparatus by a mobile station apparatus. A mobile station apparatus uses a physical random access channel to make a radio resource request when a physical uplink control channel is not configured or request transmission timing adjustment information (also called timing advance (TA)) desired for adjusting uplink transmission timing to a reception timing window of a base station apparatus from the base station apparatus.

Specifically, a mobile station apparatus transmits a preamble sequence using a radio resource for a physical random access channel configured by a base station apparatus. Upon receipt of transmission timing adjustment information, the mobile station apparatus configures a transmission timing timer that counts down for a period of validity for transmission timing adjustment information which is commonly configured by broadcast information (or is configured individually by a layer 3 message) to manage an uplink state as a transmission timing adjustment state during the period of validity (during the count-down) of the transmission timing timer and a transmission timing non-adjustment state (transmission timing unadjusted state) at times other than the period of validity (during suspension). A layer 3 message is a control-plane message exchanged between radio resource control (RRC) layers of a mobile station apparatus and a base station apparatus and used in the same meaning as RRC signaling or an RRC message. Note that the other physical channels do not relate to the embodiments of the present invention and that a detailed description thereof will be omitted.

[Measurement]

Figure 14:
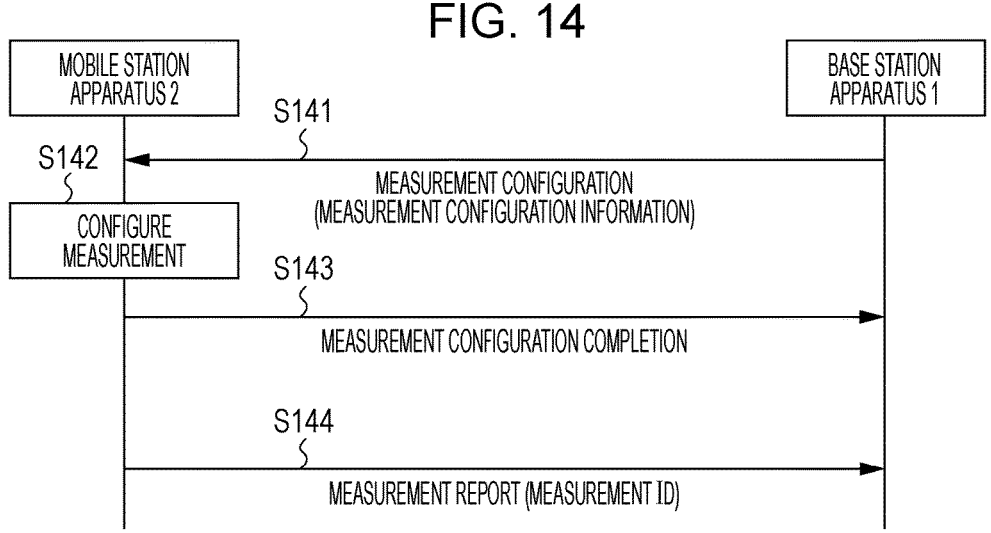
FIG. 14 is a sequence diagram showing one example of a conventional RRM measurement configuration management procedure.

FIG. 14 is a sequence diagram to describe a radio resource management (RRM) measurement configuration management method for a mobile station apparatus 2 and a base station apparatus 1 in EUTRA.

In the example of FIG. 14, the base station apparatus 1 is capable of using two different frequencies F1 and F2 as working frequencies of the base station apparatus 1 itself, and the mobile station apparatus 2 and the base station apparatus 1 are in a state where radio connection is established (radio resource control connected (RRC_Connected)) at the frequency F1. Here, the base station apparatus 1 transmits a message including a measurement configuration (hereinafter referred to as a measurement configuration message) to cause the mobile station apparatus 2 to measure received quality for a cell during communication (serving cell) and other cells (neighboring cells) (step S141). In a measurement configuration message, at least one piece of measurement configuration information for each of frequencies to be measured (the frequency F1 and the frequency F2) is included. Measurement configuration information is composed of a measurement ID, a measurement object, a measurement object ID corresponding to the measurement object, a report configuration including a measurement event, and a report configuration ID corresponding to the report configuration. It may be configured such that a plurality of report configuration IDs are linked to one measurement object ID. Similarly, it may be configured such that one report configuration ID is linked to a plurality of measurement object IDs.

For example, the case of providing notification of two measurement objects (the frequency F1 and the frequency F2) and three report configurations and configuring three measurement IDs to combinations of the measurement objects and the report configurations will be described with reference to FIG. 15.

The base station apparatus 1 allocates the identifiers 0 and 1 as measurement object IDs to the frequency F1 and the frequency F2 as measurement objects, respectively, to notify the mobile station apparatus 2. The base station apparatus 1 also allocates the identifiers 0, 1, and 2 as report configuration IDs to report configuration 1, report configuration 2, and report configuration 3 as report configurations, respectively, to notify the mobile station apparatus 2. Additionally, the base station apparatus 1 notifies the mobile station apparatus 2 of measurement IDs that are associated with (linked to) combinations of the identifiers of the measurement objects and the identifiers of the report configurations.

Figure 15:
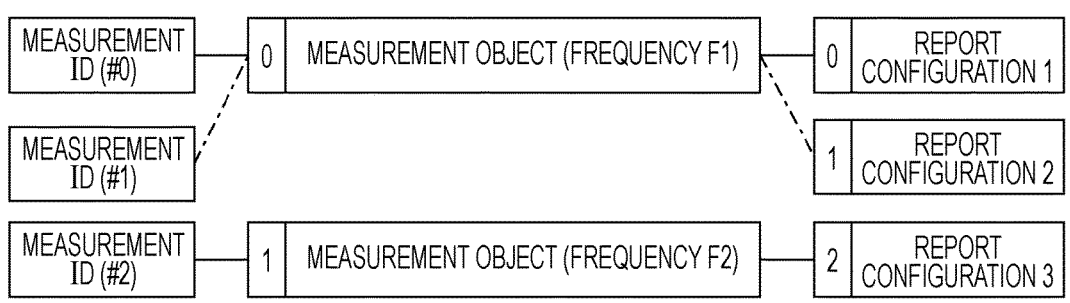
FIG. 15 is a diagram showing one example of a conventional RRM measurement configuration.

In FIG. 15, for a measurement ID #0, the combination of the measurement object with the identifier 0 (the frequency F1) and the report configuration with the identifier 0 is specified. Similarly, the combination of the measurement object with the identifier 0 (the frequency F1) and the report configuration with the identifier 1 is specified for a measurement ID #1, and the combination of the measurement object with the identifier 1 (the frequency F2) and the report configuration with the identifier 2 is specified for a measurement ID #2.

Measurement event information is information composed of a measurement event indicating a condition, such as the condition that the received quality of a cell-specific reference signal of a serving cell be below/exceed a predetermined threshold, the condition that the received quality of a cell-specific reference signal of a neighboring cell be below that for the serving cell, or the condition that the received quality for a neighboring cell exceed a predetermined threshold, and parameters used for judgment of the condition. As the parameters, pieces of information, such as a threshold, an offset value, and time for establishment of the measurement event, are configured. In NPL 3, reporting in the case where the received quality for a serving cell becomes better than a threshold is defined as a measurement event A1, for example. Reporting in the case where the received quality for an adjacent cell becomes better than a value obtained by adding an offset value to the received quality for the serving cell is defined as a measurement event A3. Reporting in the case where the received quality for an adjacent cell becomes better than a threshold is defined as a measurement event A4.

In step S142, the mobile station apparatus 2 stores the pieces of measurement configuration information configured by the base station apparatus 1 as internal information and then starts a measurement process. Specifically, as described earlier, the mobile station apparatus 2 manages a measurement ID, a measurement object ID, and a report configuration ID in association so as to be linked and unified and starts measurement based on pieces of measurement information corresponding to the IDs. In the case where these three IDs are linked and unified, the IDs are regarded as valid, and an associated measurement is started. In the case where these three IDs are not linked and unified (in the case where any ID is not configured), IDs are regarded as invalid, and an associated measurement is not started. Then, in the case where the pieces of measurement configuration information are successfully configured with no error, the mobile station apparatus 2 transmits a message indicating completion of measurement configuration (measurement configuration completion message) to the base station apparatus 1 in step S143.

In the case where the condition in any of configured measurement events is judged using the parameters to be satisfied, the measurement event is considered to be triggered, and the mobile station apparatus 2 transmits a measurement report message to the base station apparatus 1 (step S144). In the measurement report message, at least a measurement ID linked to a report configuration ID of the triggered measurement event and, optionally, a measurement result of an associated cell are configured and reported. The base station apparatus 1 knows to which report configuration ID of the measurement event the measurement ID is linked, so that the mobile station apparatus 2 need not provide notification of the report configuration ID in the measurement report message.

With consideration of the above matters, preferred embodiments of the present invention will be described below in detail with reference to the attached drawings. Note that if it is determined that specific descriptions of known functions and configurations associated with the embodiments of the present invention in the descriptions of the embodiments of the present invention make the scope of the embodiments of the present invention unclear, the detailed descriptions will be omitted.

[First Embodiment]

A first embodiment of the present invention will be described below.

FIG. 1 is a block diagram showing one example of a base station apparatus 1 according to an embodiment of the present invention. The present base station apparatus 1 is composed of a reception unit 101, a demodulation unit 102, a decoding unit 103, a control unit 104, a coding unit 105, a modulation unit 106, a transmission unit 107, a network signal transmission and reception unit 108, and a higher layer 109.

The higher layer 109 outputs downlink traffic data and downlink control data to the coding unit 105. The coding unit 105 codes each piece of input data and outputs the piece of data to the modulation unit 106. The modulation unit 106 modulates a signal input from the coding unit 105. In addition, a downlink reference signal is multiplexed into the signal modulated in the modulation unit 106 to be mapped as a signal in the frequency domain. The transmission unit 107 converts the signal input from the modulation unit 106 to a signal in the time domain to carry out power amplification with the converted signal superimposed on a carrier at a prescribed frequency and transmission. A downlink data channel in which downlink control data is arranged typically constitutes a layer 3 message (radio resource control (RRC) message).

The reception unit 101 converts a received signal from the mobile station apparatus 2 (see FIG. 2) to a baseband digital signal. The digital signal obtained through the conversion by the reception unit 101 is input to the demodulation unit 102 for demodulation. The signal demodulated by the demodulation unit 102 is then input to the decoding unit 103 for decoding. The decoding unit 103 appropriately separates the received signal into uplink traffic data and uplink control data and outputs the uplink traffic data and the uplink control data to the higher layer 109.

Base station apparatus control information for control of the blocks is input from the higher layer 109 to the control unit 104. From the control unit 104, base station apparatus control information associated with transmission is appropriately input as transmission control information to the blocks of the coding unit 105, the modulation unit 106, and the transmission unit 107, and base station apparatus control information associated with reception is appropriately input as reception control information to the blocks of the reception unit 101, the demodulation unit 102, and the decoding unit 103.

The network signal transmission and reception unit 108 carries out transmission or reception of a control message between a plurality of base station apparatuses 1 (or control station devices (MMEs), gateways, or MCEs) and the base station apparatus 1. A control message is transmitted and received through a network line. A control message is exchanged on a logical interface called the S1 interface, the X2 interface, the M1 interface, or the M2 interface. In FIG. 1, other components of the base station apparatus 1 are not related to the present embodiment, and are omitted.

Figure 2:
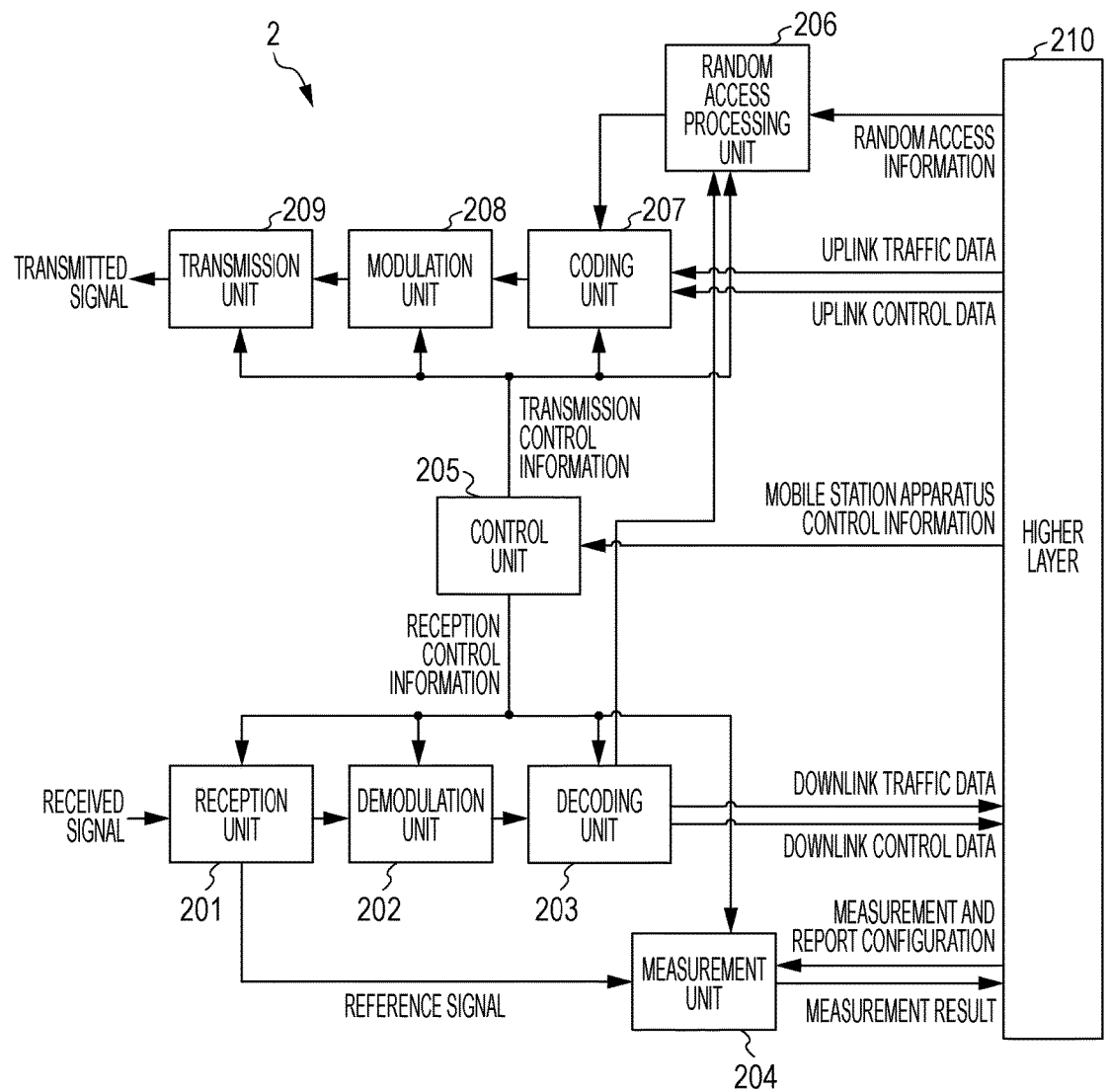
FIG. 2 is a block diagram showing one example of a mobile station apparatus according to an embodiment of the present invention.

FIG. 2 is a block diagram showing one example of a mobile station apparatus 2 according to an embodiment of the present invention. The present mobile station apparatus 2 is composed of a reception unit 201, a demodulation unit 202, a decoding unit 203, a measurement unit 204, a control unit 205, a random access processing unit 206, a coding unit 207, a modulation unit 208, a transmission unit 209, and a higher layer 210.

Prior to reception, the higher layer 210 outputs mobile station apparatus control information to the control unit 205. The control unit 205 appropriately outputs mobile station apparatus control information related to reception as reception control information to the reception unit 201, the demodulation unit 202, the decoding unit 203, and the measurement unit 204. In the reception control information, pieces of information, such as demodulation information, decoding information, information on a receive frequency band, reception timing for each channel, a multiplexing method, and radio resource arrangement information, are included as reception schedule information.

The reception unit 201 receives a signal from the base station apparatus 1 (to be described later) through one or more receivers (not shown) in a frequency band, of which the reception unit 201 is notified in the reception control information, converts the received signal to a baseband digital signal, and outputs the baseband digital signal to the demodulation unit 202. The reception unit 201 also outputs a received reference signal to the measurement unit 204. The demodulation unit 202 demodulates the received signal and outputs the demodulated signal to the decoding unit 203. The decoding unit 203 correctly decodes the demodulated signal based on the reception control information, appropriately separates the decoded signal into downlink traffic data and downlink control data, and outputs the downlink traffic data and the downlink control data to the higher layer 210. The measurement unit 204 measures the RSRP, the RSRQ, the CSI, or the like of the received reference signal and outputs a measurement result to the higher layer 210.

Prior to transmission, the higher layer 210 outputs mobile station apparatus control information to the control unit 205. The control unit 205 appropriately outputs mobile station apparatus control information related to transmission as transmission control information to the random access processing unit 206, the coding unit 207, the modulation unit 208, and the transmission unit 209. In the transmission control information, pieces of information, such as coding information, modulation information, information on a transmit frequency band, transmission timing for each channel, a multiplexing method, and radio resource arrangement information, are included as uplink scheduling information of a transmitted signal.

The higher layer 210 appropriately outputs uplink traffic data and uplink control data to the coding unit 207 in accordance with an uplink channel. The coding unit 207 appropriately codes each piece of data in accordance with the transmission control information and outputs the piece of data to the modulation unit 208. The modulation unit 208 modulates a signal coded in the coding unit 207. The modulation unit 208 also multiplexes a downlink reference signal to the modulated signal to be mapped to the frequency band.

The transmission unit 209 converts the signal in the frequency band output from the modulation unit 208 to a signal in the time domain to carry out power amplification with the converted signal superimposed on a carrier at a prescribed frequency and transmission from one or more transmitters (not shown).

In FIG. 2, other components of the mobile station apparatus 2 are not related to the present embodiment, and are omitted.

Figure 3:
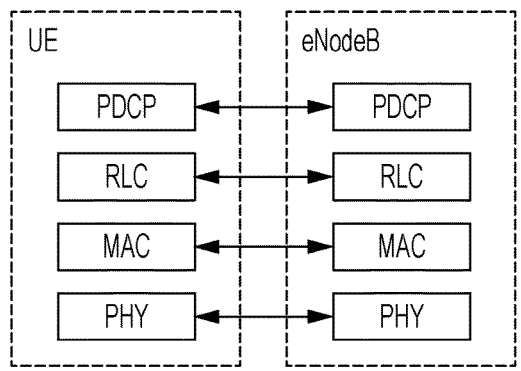
FIG. 3 is a diagram showing a user plane architecture of a base station apparatus and a mobile station apparatus according to an embodiment of the present invention.
Figure 4:
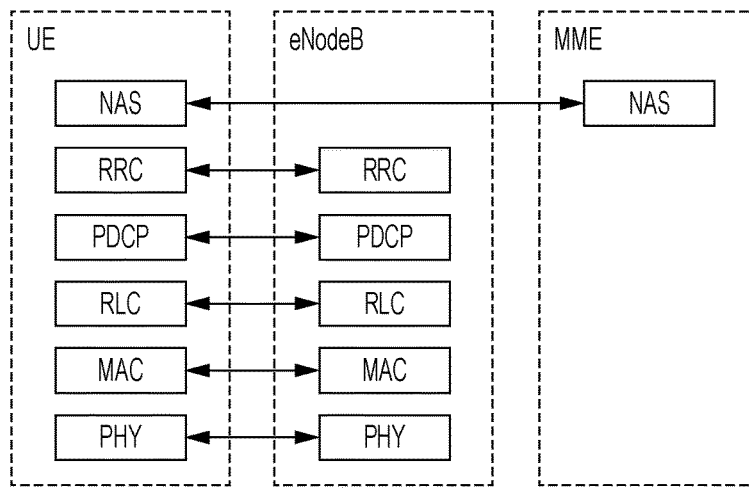
FIG. 4 is a diagram showing a control plane architecture of a base station apparatus and a mobile station apparatus according to an embodiment of the present invention.

The architecture of a radio interface protocol between a base station apparatus and a mobile station apparatus will now be illustrated. FIG. 3 is a block diagram showing a radio protocol architecture of a user plane (U-plane). FIG. 4 is a block diagram showing a radio protocol architecture of a control plane (C-plane). A user plane is a protocol stack for user data transmission and reception, and a control plane is a protocol stack for control signal transmission and reception.

Referring to FIG. 3 and FIG. 4, at a physical layer (PHY) at a first layer (layer 1), communication is carried out using the physical channels described earlier between different physical layers, i.e., between physical layers on the transmitting side and on the receiving side. A physical layer is coupled to a higher medium access control (MAC) layer via a transport channel, and the physical layer provides an information transfer service to the MAC layer via the transport channel.

At a MAC layer at a second layer (layer 2), mapping between a logical channel and a transport channel, error correction through hybrid automatic repeat request (HARQ), a transfer process based on priority between logical channels, and the like are carried out. The MAC layer is coupled to a radio link control (RLC) layer, which is a higher layer, via a logical channel.

An RLC layer at the second layer supports the reliability of data transfer. At the RLC layer, there are three types of operation modes, a transparent mode (TM), an unacknowledged mode (UM), and an acknowledged mode (AM), corresponding to respective data transmission methods. In AM, error correction through ARQ, protocol error detection, and the like are carried out.

A packet data convergence protocol (PDCP) layer at the second layer carries out header compression to reduce an IP packet header size, encryption of data, decoding of a cipher, and the like.

A radio resource control (RRC) layer at a third layer (layer 3) is defined only in a control plane. The RRC layer carries out broadcast of non-access stratum (NAS) and access stratum (AS) related information, management (establishment/maintenance/release) of RRC connection, configuration, re-configuration, and release of a radio bearer (RB), mobility (handover), management and reporting of measurement, QoS management, and the like.

A NAS layer located higher than an RRC layer carries out session management, mobility management, and the like.

Here, a MAC layer and an RRC layer of the base station apparatus 1 exist as a part of the higher layer 109. A MAC layer of the mobile station apparatus 2 exists as a part of the random access processing unit 206 and the higher layer 209, and an RRC layer of the mobile station apparatus 2 exists as a part of the measurement unit 204 and the higher layer 209.

Subsequently, a measurement configuration in the present embodiment will be described with reference to FIG. 5.

Like the conventional RRM measurement configuration described earlier, the measurement configuration in the present embodiment is composed of a measurement ID, a measurement object, a measurement object ID corresponding to the measurement object, a report configuration including a measurement event, and a report configuration ID corresponding to the report configuration. In the present embodiment, a configuration for a measurement object is defined so as to allow inclusion of a configuration for a channel state information reference signal, and the channel state information reference signal configuration is adapted so as to allow inclusion of a measurement offset.

Figure 5:
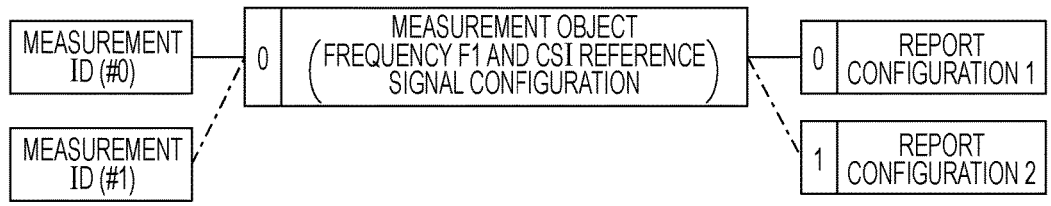
FIG. 5 is a diagram showing one example of a measurement configuration in a first embodiment of the present invention.

For example, in FIG. 5, one measurement object is defined. A measurement configuration includes two report configurations, and two measurement IDs are configured for combinations of the measurement object and the report configurations.

In FIG. 5, for a measurement ID #0, the combination of the measurement object with the identifier 0 (a frequency F1 and a channel state information reference signal configuration) and report configuration 1 with the identifier 0 is specified. Similarly, for a measurement ID #1, the combination of the measurement object with the identifier 0 (the frequency F1 and the channel state information reference signal configuration) and report configuration 2 with the identifier 1 is specified. The channel state information reference signal configuration includes a plurality of configurations for channel state information reference signals. As an example, the present embodiment assumes that four channel state information reference signal configurations (#1, #2, #3, and #4) are included. Channel state information reference signal configuration #1 includes a measurement offset C1, channel state information reference signal configuration #2 includes a measurement offset C2, channel state information reference signal configuration #3 includes a measurement offset C3, and channel state information reference signal configuration #4 includes a measurement offset C4. Assume that a measurement event to report in the case where a measured value exceeds a threshold (Th1) is specified in report configuration 1 and that a measurement event to report in the case where a measured value falls below a threshold (Th2) is specified in report configuration 2.

Figure 6:
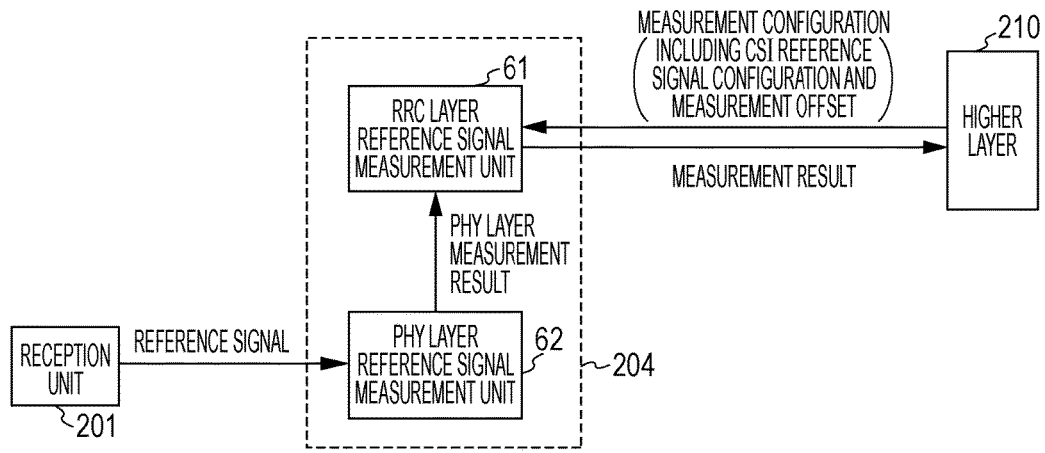
FIG. 6 is a block diagram showing one example of a measurement unit of a mobile station apparatus in the first embodiment of the present invention.

Subsequently, the measurement unit 204 will be described with reference to FIG. 6.

The measurement unit 204 includes an RRC layer reference signal measurement unit 61 and a PHY layer reference signal measurement unit 62. The PHY layer reference signal measurement unit 62 measures the RSRP, the RSRQ, the channel state, or the like of a reference signal input from the reception unit 201 to notify the RRC layer reference signal measurement unit 61. For a measurement object configured by a measurement configuration, of which the RRC layer reference signal measurement unit 61 is notified by the higher layer 210, the RRC layer reference signal measurement unit 61 averages individual measurement results, of which the RRC layer reference signal measurement unit 61 is notified by the PHY layer reference signal measurement unit 62, if necessary, determines whether a report configuration is met, and notifies the higher layer 210 of a measurement result. Here, the measurement unit 204 selects a channel state information reference signal to be measured, based on a channel state information reference signal configuration included in the measurement object of the measurement configuration, of which the measurement unit 204 is notified by the higher layer 210. The measurement unit 204 also adds a measurement offset included in the channel state information reference signal configuration to each measurement result of the channel state information reference signal to determine whether the report configuration is met.

That is, in the example of the measurement configuration shown in FIG. 5, if measurement results of channel state information reference signal configurations #1, #2, #3, and #4 are P1, P2, P3, and P4, respectively, comparison of P1+C1 with Th1, comparison of P2+C2 with Th1, comparison of P3+C3 with Th1, comparison of P4+C4 with Th1 are carried out for the measurement ID #0. In a measurement with the measurement ID #1, comparison of P1+C1 with Th2, comparison of P2+C2 with Th2, comparison of P3+C3 with Th2, and comparison of P4+C4 with Th2 are carried out.

Here, notification of a channel state information reference signal configuration may be provided such that a physical parameter desired for measurement (for example, arrangement information) is to be included in a configuration for a measurement object. Alternatively, notification of a physical parameter (for example, arrangement information) together with an identifier that allows identification of one among a plurality of channel state information reference signal configurations may be provided using an information element, such as PhysicalConfigDedicated or PhysicalConfigDedicatedSCell-r10, and notification of the identifier may be provided such that the identifier is to be included in a configuration for a measurement object.

Subsequently, a measurement procedure in a communication system of the present embodiment will be described with reference to FIG. 7.

Figure 7:
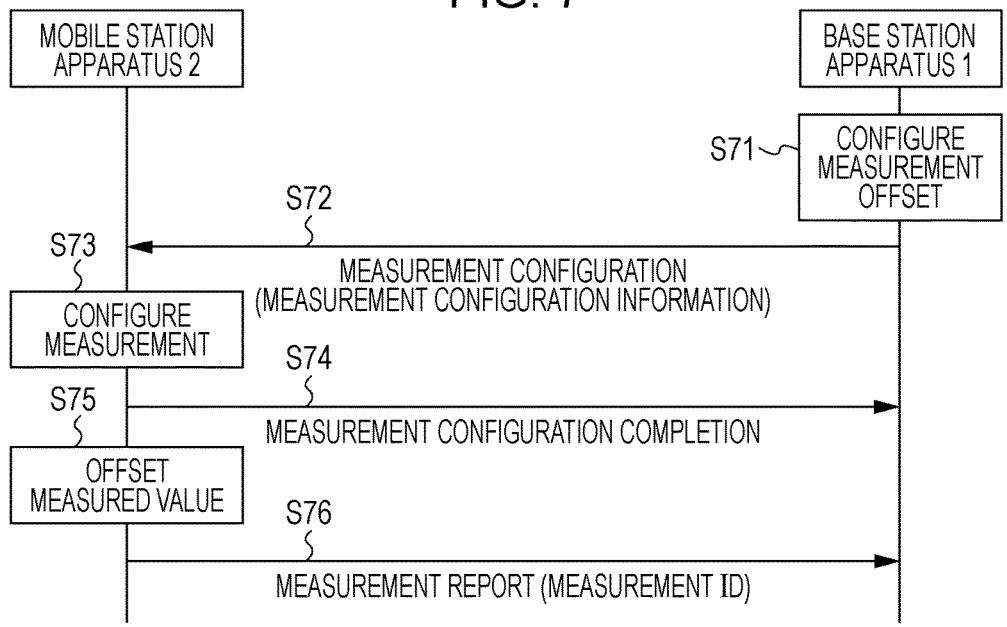
FIG. 7 is a flowchart showing one example of a measurement configuration procedure in the first embodiment of the present invention.

In FIG. 7, firstly, the base station apparatus 1 configures a measurement offset to be included in measurement configuration information (step S71) and provides notification of a measurement configuration including the measurement configuration information using an RRC message (step S72). As for the configuration of the measurement offset, in the case of, for example, carrying out measurement for downlink intercell coordinated communication, a cell with good downlink signal received quality to transmit a channel state information reference signal is desirably detected. The above aim can be achieved by configuring all measurement offsets so as to have the same value (preferably 0). In the case of, for example, carrying out measurement for uplink intercell coordinated communication, a cell near a mobile station apparatus is desirably detected even if downlink signal received quality is not the best. In this case, a measurement offset of a configuration for a channel state information reference signal to be transmitted by a cell, such as an RRH, with low transmission power (for the channel state information reference signal as well) is made larger than a measurement offset for a macrocell with high transmission power. Although a condition of a report configuration remains unchanged, a cell with low transmission power can be detected, and the above aim can be achieved.

The mobile station apparatus 2 notified of the measurement configuration information in step S72 stores the notified measurement configuration information as internal information and starts a measurement process based on the measurement configuration information (step S73). Specifically, the mobile station apparatus 2 manages a measurement ID, the identifier of a measurement object, and the identifier of a report configuration by linking and unifying them for measurement. In the case where the identifier of a measurement object linked to a measurement ID and the identifier of a report configuration linked to the measurement ID are present, the configuration is regarded as valid, and measurement for the linked measurement object is carried out. In the case where either one or both of the identifier of a measurement object linked to the measurement ID and the identifier of a report configuration linked to the measurement ID are absent, the configuration is regarded as invalid, and measurement associated with the measurement ID is not carried out. Then, in the case where the measurement configuration information is successfully configured with no error, the mobile station apparatus 2 notifies the base station apparatus 1 of measurement configuration completion (step S74).

In step S75, the PHY layer reference signal measurement unit 62 measures a channel state information reference signal based on a channel state information reference signal configuration included in a configuration for a measurement object and reports to the RRC layer reference signal measurement unit 61. The RRC layer reference signal measurement unit 61 averages reported measured values if necessary, adds a measurement offset included in the channel state information reference signal configuration, and determines whether a condition of a report configuration is met.

In the case where the condition of the report configuration is satisfied, the mobile station apparatus 2 transmits a measurement report to the base station apparatus 1 using an RRC message (step S76). The measurement report includes at least a measurement ID. In the case where one or more channel state information reference signal configurations are included in the measurement object, an identifier that allows identification of one among the plurality of channel state information reference signal configurations may also be included in the measurement report. In this case, in order to make a message for the measurement report common to a conventional message (Measurement Report), the identifier may be reported as a physical cell identifier (physCellId) to the base station apparatus 1.

As described above, a configuration for a measurement object is defined so as to allow inclusion of a configuration for a channel state information reference signal, and the channel state information reference signal configuration is adapted so as to allow inclusion of a measurement offset. It is thus possible to add a mechanism of channel state information reference signal management and measurement which serves different purposes with minor alterations to the mechanism of conventional RRM measurement.

In the present embodiment, in the case where notification of a configuration for a channel state information reference signal configured in a measurement object is provided such that from which cell the reference signal is transmitted is clear, and a measurement offset is not configured for each of channel state information reference signal configurations, a measurement offset (cellIndividualOffset) for each cell specified by conventional RRM measurement may be added at the time of determination of whether a condition of a report configuration is met. In the case where notification of a configuration for a channel state information reference signal configured in a measurement object is provided such that from which cell the reference signal is transmitted is clear, and a measurement offset is configured for each of channel state information reference signal configurations, a measurement offset included in each channel state information reference signal configuration may be used instead of a measurement offset for each cell specified by conventional RRM measurement.

[Second Embodiment]

A second embodiment of the present invention will be described below. While the example of carrying out measurements, based on a channel state information reference signal, for different purposes using a measurement offset included in a channel state information reference signal configuration of a configuration for a measurement object has been illustrated in the first embodiment, an example of explicitly specifying a channel state information reference signal configuration to be included in a configuration for a measurement object in accordance with the purpose of measurement and an example of specifying one of different types of measurement events in accordance with the purpose of measurement are illustrated in the present embodiment.

A communication system (a base station apparatus 1 and a mobile station apparatus 2) used in a description of the present embodiment is similar to that in FIGS. 1 and 2 in the first embodiment, and a detailed description thereof will not be repeated.

Subsequently, a measurement configuration in the present embodiment will be described with reference to FIG. 8.

Like the conventional RRM measurement configuration described earlier, the measurement configuration in the present embodiment is composed of a measurement ID, a measurement object, a measurement object ID corresponding to the measurement object, a report configuration including a measurement event, and a report configuration ID corresponding to the report configuration. Additionally, in the present embodiment, a configuration for a measurement object is defined so as to include a configuration for a channel state information reference signal.

Figure 8:
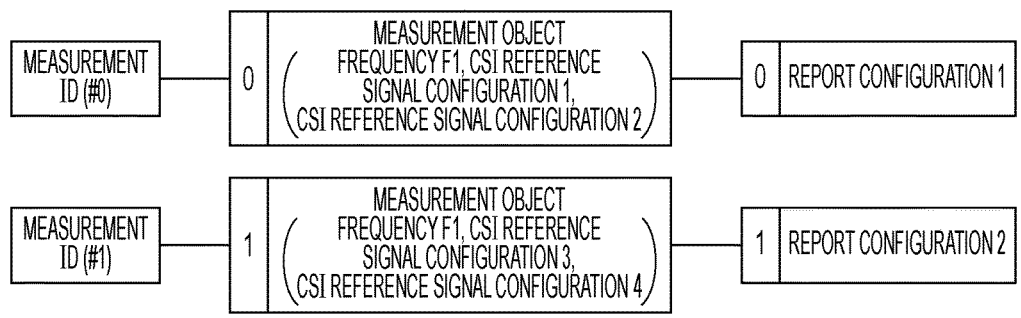
FIG. 8 is a diagram showing one example of a measurement configuration in a second embodiment of the present invention.

For example, in FIG. 8, two measurement objects including a channel state information reference signal configuration are defined in a measurement configuration. Additionally, two report configurations are included in the measurement configuration.

In FIG. 8, for a measurement ID #0, the combination of a measurement object (a frequency F1, CSI reference signal configuration 1, and CSI reference signal configuration 2) with the identifier 0 and report configuration 1 with the identifier 0 is specified. Similarly, the combination of a measurement object (the frequency F1, CSI reference signal configuration 3, and CSI reference signal configuration 4) with the identifier 1 and report configuration 2 with the identifier 1 is specified for a measurement ID #1.

Figure 9:
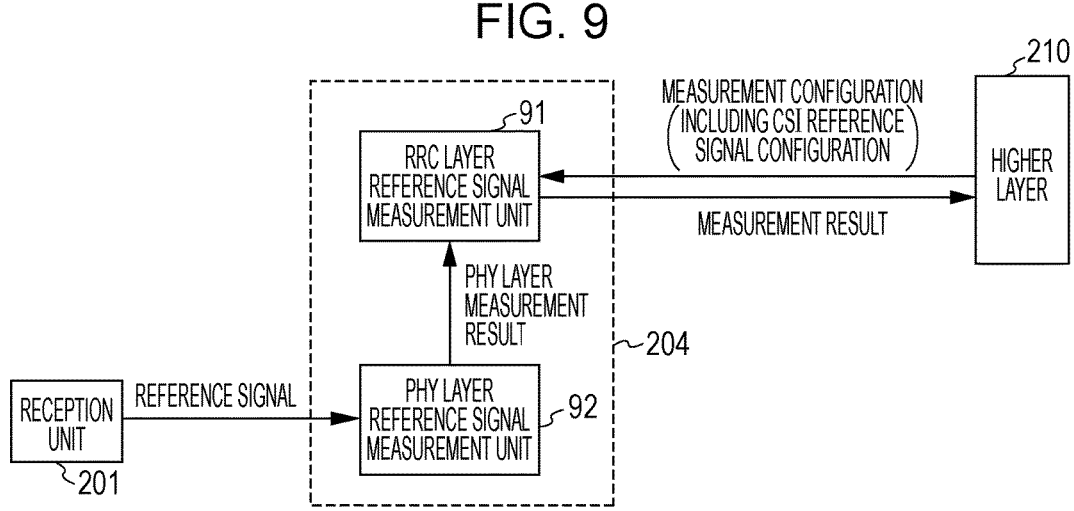
FIG. 9 is a block diagram showing one example of a measurement unit of a mobile station apparatus in the second embodiment of the present invention.

Subsequently, a measurement unit 204 will be described with reference to FIG. 9.

The measurement unit 204 includes an RRC layer reference signal measurement unit 91 and a PHY layer reference signal measurement unit 92. The PHY layer reference signal measurement unit 92 measures the RSRP, the RSRQ, the channel state, or the like of a reference signal input from a reception unit 201 to notify the RRC layer reference signal measurement unit 91. For a measurement object configured by a measurement configuration, of which the RRC layer reference signal measurement unit 91 is notified by a higher layer 210, the RRC layer reference signal measurement unit 91 averages individual measurement results, of which the RRC layer reference signal measurement unit 91 is notified by the PHY layer reference signal measurement unit 92, if necessary, determines whether a report configuration is met, and notifies the higher layer 210 of a measurement result.

Here, notification of a channel state information reference signal configuration may be provided such that a physical parameter desired for measurement (for example, arrangement information) is to be included in a configuration for a measurement object. Alternatively, notification of a physical parameter (for example, arrangement information) together with an identifier that allows identification of one among a plurality of channel state information reference signal configurations may be provided using an information element, such as PhysicalConfigDedicated or PhysicalConfigDedicatedSCell-r10, and notification of the identifier may be provided such that the identifier is to be included in a configuration for a measurement object.

Subsequently, a measurement procedure in the communication system of the present embodiment will be described with reference to FIG. 10.

In FIG. 10, firstly, the base station apparatus 1 configures a channel state information reference signal configuration to be included in measurement configuration information (step S1001) and provides notification of a measurement configuration including the measurement configuration information using an RRC message (step S1002). As for a configuration for a channel state information reference signal, in the case of, for example, carrying out measurement for downlink intercell coordinated communication, a cell with good downlink signal received quality to transmit a channel state information reference signal is desirably detected. The above aim can be achieved by configuring all configurable channel state information reference signals. In the case of, for example, carrying out measurement for uplink intercell coordinated communication, a cell near a mobile station apparatus is desirably detected even if downlink signal received quality is not the best. The above aim can be achieved by configuring a channel state information reference signal to be transmitted by a cell, such as an RRH, with low transmission power. For this reason, configuring all channel state information reference signals that can be configured as the measurement object with the identifier 0 and configuring a channel state information reference signal to be transmitted by a cell, such as an RRH, with low transmission power as the measurement object with the identifier 1, or the like is conceivable in the example in FIG. 8.

The mobile station apparatus 2 notified of the measurement configuration information in step S1002 stores the notified measurement configuration information as internal information and starts a measurement process based on the measurement configuration information (step S1003). Specifically, the mobile station apparatus 2 manages a measurement ID, the identifier of a measurement object, and the identifier of a report configuration by linking and unifying them for measurement. In the case where the identifier of a measurement object linked to a measurement ID and the identifier of a report configuration linked to the measurement ID are present, the configuration is regarded as valid, and measurement for the linked measurement object is carried out. In the case where either one or both of the identifier of a measurement object linked to the measurement ID and the identifier of a report configuration linked to the measurement ID are absent, the configuration is regarded as invalid, and measurement associated with the measurement ID is not carried out. Then, in the case where the measurement configuration information is successfully configured with no error, the mobile station apparatus 2 notifies the base station apparatus 1 of measurement configuration completion (step S1004).

In step S1005, the PHY layer reference signal measurement unit 92 measures a channel state information reference signal based on the channel state information reference signal configuration included in a configuration for a measurement object and reports to the RRC layer reference signal measurement unit 91. The RRC layer reference signal measurement unit 91 averages reported measured values if necessary and determines whether a condition of a report configuration is met.

In the case where the condition of the report configuration is satisfied, the mobile station apparatus 2 transmits a measurement report to the base station apparatus 1 using an RRC message (step S1006). The measurement report includes at least a measurement ID. In the case where one or more channel state information reference signal configurations are included in a measurement object, an identifier that allows identification of one among the plurality of channel state information reference signal configurations may also be included in the measurement report. In this case, in order to make a message for the measurement report common to a conventional message (Measurement Report), the identifier may be reported as a physical cell identifier (physCellId) to the base station apparatus 1.

As described above, one of different channel state information reference signals is configured at the same frequency in accordance with the purpose of measurement. It is thus possible to add a mechanism of channel state information reference signal management and measurement which serves different purposes with minor alterations to the mechanism of conventional RRM measurement, like the first embodiment.

As another example, setting up different report configurations corresponding to a single measurement object for downlink intercell coordinated communication and uplink intercell coordinated communication is conceivable. For example, it is conceivable to carry out measurement based on RSPP which is a measure of received quality to identify a cell used in downlink intercell coordinated communication and carry out measurement based on RSRQ or a path loss value which is a different measure to identify a cell used in uplink intercell coordinated communication. In this case, it is possible to add a mechanism of channel state information reference signal management and measurement which serves different purposes by configuring a plurality of different report configurations for a single measurement object. The plurality of report configurations may be adapted to have different measures (RSRP, RSRQ, and a path loss value), and different thresholds may be configured for a single measure. Additionally, a report configuration for a report based on a measurement event and a report configuration for a periodic report may be configured as the plurality of different report configurations for the previous period.

For example, a case is conceivable where the types of a measurement event suitable for downlink intercell coordinated communication and a measurement event suitable for uplink intercell coordinated communication are different. In this case, a plurality of different report configurations are configured for a single measurement object, and different types of measurement events are configured for the respective report configurations. It is thus possible to add a mechanism of channel state information reference signal management and measurement which serves different purposes.

A case is also conceivable where a trigger-type report configuration based on a measurement event is adopted for downlink intercell coordinated communication while a report configuration for a periodic report is adopted for uplink intercell coordinated communication instead of a trigger-type report configuration based on a measurement event. In this case, a plurality of different report configurations are configured for a single measurement object, one type of report configuration is configured as a trigger-type report configuration based on a measurement event, and the other type of report configuration is configured as a report configuration for a periodic report. It is thus possible to add a mechanism of channel state information reference signal management and measurement which serves different purposes.

[Third Embodiment]

A third embodiment of the present invention will be described below. The present embodiment will illustrate an example in which channel state information reference signal configurations to be included in a configuration for a measurement object are grouped.

A communication system (a base station apparatus 1 and a mobile station apparatus 2) used in a description of the present embodiment is similar to that in FIGS. 1 and 2 in the first embodiment, and a detailed description thereof will not be repeated.

Subsequently, a measurement configuration in the present embodiment will be described with reference to FIG. 11.

Like the conventional RRM measurement configuration described earlier, the measurement configuration in the present embodiment is composed of a measurement ID, a measurement object, a measurement object ID corresponding to the measurement object, a report configuration including a measurement event, and a report configuration ID corresponding to the report configuration. Additionally, in the present embodiment, a configuration for a measurement object is defined so as to include grouped channel state information reference signal configurations.

For example, in FIG. 11, a measurement object including a channel state information reference signal configuration is defined in a measurement configuration. Additionally, two report configurations are included in the measurement configuration.

In FIG. 11, for a measurement ID #0, the combination of a measurement object (a frequency F1, a group of first channel state information reference signal configurations, and a group of second channel state information reference signal configurations) with the identifier 0 and report configuration 1 with the identifier 0 is specified. Similarly, the combination of a measurement object (the frequency F1, the group of first channel state information reference signal configurations, and the group of second channel state information reference signal configurations) with the identifier 0 and report configuration 2 with the identifier 1 is specified for a measurement ID #1.

Subsequently, a measurement unit 204 will be described with reference to FIG. 12.

The measurement unit 204 includes an RRC layer reference signal measurement unit 1201 and a PHY layer reference signal measurement unit 1202. The PHY layer reference signal measurement unit 1202 measures the RSRP, the RSRQ, the channel state, and the like of a reference signal input from a reception unit 201 to notify the RRC layer reference signal measurement unit 1201. For a measurement object configured by a measurement configuration, of which the RRC layer reference signal measurement unit 1201 is notified by a higher layer 210, the RRC layer reference signal measurement unit 1201 averages individual measurement results, of which the RRC layer reference signal measurement unit 1201 is notified by the PHY layer reference signal measurement unit 1202, if necessary, determines whether a report configuration is met, and notifies the higher layer 210 of a measurement result.

Here, notification of a channel state information reference signal configuration may be provided such that a physical parameter desired for measurement (for example, arrangement information) is to be included in a configuration for a measurement object. Alternatively, notification of a physical parameter (for example, arrangement information) together with an identifier that allows identification of one among a plurality of channel state information reference signal configurations may be provided using an information element, such as PhysicalConfigDedicated or PhysicalConfigDedicatedSCell-r10, and notification of the identifier may be provided such that the identifier is to be included in a configuration for a measurement object.

Subsequently, a measurement procedure in the communication system of the present embodiment will be described with reference to FIG. 13.

Figure 13:
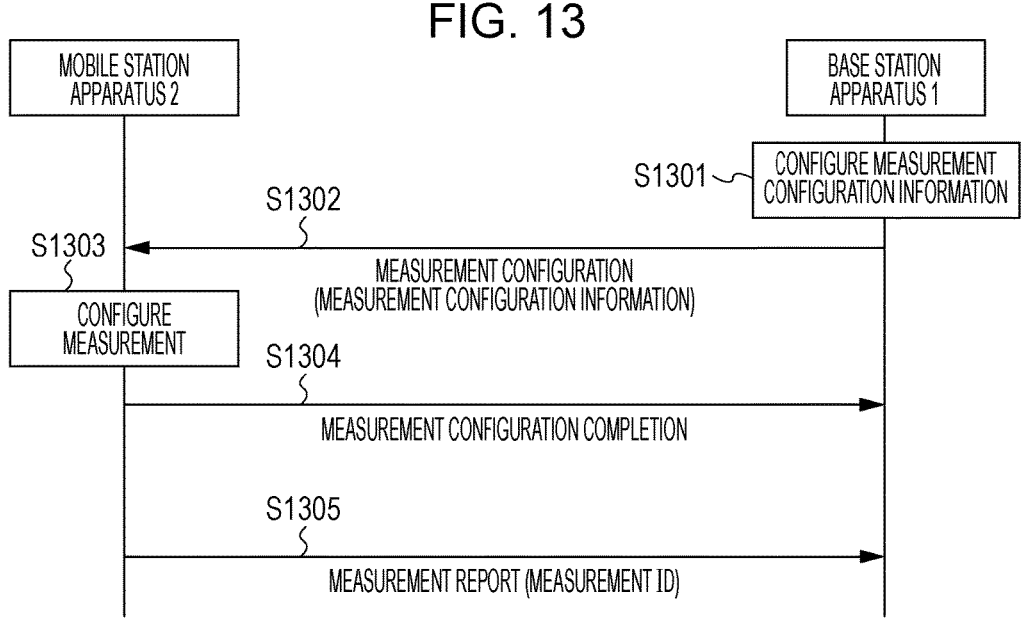
FIG. 13 is a flowchart showing one example of a measurement configuration procedure in the third embodiment of the present invention.

In FIG. 13, firstly, the base station apparatus 1 configures a channel state information reference signal configuration to be included in measurement configuration information (step S1301) and provides notification of a measurement configuration including the measurement configuration information using an RRC message (step S1302). As for a configuration for a channel state information reference signal, in the case of, for example, carrying out measurement for downlink intercell coordinated communication, a cell with good downlink signal received quality to transmit a channel state information reference signal is desirably detected. In the case of, for example, carrying out measurement for uplink intercell coordinated communication, a cell near a mobile station apparatus is desirably detected even if downlink signal received quality is not the best. For this reason, a plurality of groups are configured based on difference in transmission power. For example, a configuration for each of one or more channel state information reference signals to be transmitted by a macrocell with high transmission power is set as a first channel state information reference signal configuration, and a configuration for each of one or more channel state information reference signals to be transmitted by a cell, such as an RRH, with low transmission power is set as a second channel state information reference signal configuration. Here, grouping is carried out based on difference in transmission power. The present invention, however, is not limited to this, and grouping may be carried out based on difference in cell type or any other criterion. As a group identification method, a group identifier for group identification may be included in each channel state information reference signal configuration. Alternatively, one or more information elements (IEs) including one or more channel state information reference signal configurations may be defined, and the information elements may be grouped.

Additionally, in the communication system of the present embodiment, a measurement event of a report configuration for conditional judgment is defined for each of the plurality of groups to allow inclusion of the measurement event in a measurement configuration. The measurement event may be, for example, reporting top N ones of received quality in each group in the case where the received quality of any one of channel state information reference signals of a plurality of configured groups exceeds/falls below a threshold or specifying a specific one of the groups and reporting top N ones of received quality in the specific group in the case where the received quality of any one of channel state information reference signals of the specific group exceeds/falls below a threshold. Setting up a report configuration for each of a plurality of groups included in one measurement object, as described above, allows the base station apparatus 1 to efficiently obtain measurement results of a macrocell with high transmission power and a cell, such as an RRH, with low transmission power even in, for example, measurement for uplink intercell coordinated communication.

Referring back to FIG. 13, the mobile station apparatus 2 notified of the measurement configuration information in step S1302 stores the notified measurement configuration information as internal information and starts a measurement process based on the measurement configuration information (step S1303). Specifically, the mobile station apparatus 2 manages a measurement ID, the identifier of a measurement object, and the identifier of a report configuration by linking and unifying them for measurement. In the case where the identifier of a measurement object linked to a measurement ID and the identifier of a report configuration linked to the measurement ID are present, the configuration is regarded as valid, and measurement for the linked measurement object is carried out. In the case where either one or both of the identifier of a measurement object linked to the measurement ID and the identifier of a report configuration linked to the measurement ID are absent, the configuration is regarded as invalid, and measurement associated with the measurement ID is not carried out. Then, in the case where the measurement configuration information is successfully configured with no error, the mobile station apparatus 2 notifies the base station apparatus 1 of measurement configuration completion (step S1304).

After that, the PHY layer reference signal measurement unit 1202 measures a channel state information reference signal based on a channel state information reference signal configuration included in a configuration for a measurement object and reports to the RRC layer reference signal measurement unit 1201. The RRC layer reference signal measurement unit 91 averages reported measured values if necessary and determines whether a condition of a report configuration is met.

In the case where the condition of the report configuration is satisfied, the mobile station apparatus 2 transmits a measurement report to the base station apparatus 1 using an RRC message (step S1305). The measurement report includes at least a measurement ID. In the case where one or more channel state information reference signal configurations are included in a measurement object, an identifier that allows identification of one among the plurality of channel state information reference signal configurations may also be included in the measurement report. In this case, in order to make a message for the measurement report common to a conventional message (Measurement Report), the identifier may also be reported as a physical cell identifier (physCellId) to the base station apparatus 1.

As described above, one measurement object is configured so as to include grouped channel state information reference signal configurations, and a mechanism for carrying out conditional judgment for a report configuration for each group is introduced. It is thus possible to carry out channel state information reference signal management and measurement which serves a plurality of different purposes.

Note that although only a case where a configuration for a channel state information reference signal to be measured is included in a measurement object has been described in the above first to third embodiments, the present invention is not limited to this, and a channel state information reference signal configured for intercell coordinated communication may be included in reference signals to be measured. For example, in one communication system, the channel state information reference signal configured for intercell coordinated communication may always be included in reference signals to be measured. In another communication stem, the channel state information reference signal configured for intercell coordinated communication may be included in reference signals to be measured based on a measurement event.

In the latter communication system, the channel state information reference signal configured for intercell coordinated communication may be used as an object to be compared with a channel state information reference signal configured in a measurement object for one measurement event. For example, it is conceivable to define a measurement event to report in the case where the received quality of a channel state information reference signal configured in a measurement object exceeds/falls below the received quality of a channel state information reference signal configured for intercell coordinated communication.

For example, a case is conceivable where the channel state information reference signals configured in the respective measurement objects may be different if a measurement event, in which the received quality of a channel state information reference signal, through which the mobile station apparatus 2 notifies the base station apparatus 1 of channel state information (CSI), is compared with the received quality of a channel state information reference signal configured in a measurement object, is used for management of downlink intercell coordinated communication, and a measurement event, in which a threshold configured in a report configuration is compared with the received quality of a channel state information reference signal configured in a measurement object, is used for management of uplink intercell coordinated communication. A channel state information reference signal configured in a measurement object constructed for management of uplink intercell coordinated communication may be a channel state information reference signal, through which the mobile station apparatus 2 notifies the base station apparatus 1 of channel state information. Since a measurement object suitable for management of downlink intercell coordinated communication and a measurement object suitable for management of uplink intercell coordinated communication are allowed to be separate from and independent of each other, measurement objects suitable for the respective purposes can be configured, as described above. In summary, in the embodiments of the present invention, the base station apparatus 1 and the mobile station apparatus 2 can support efficient measurement by allowing independent and simultaneous construction of a measurement object to be compared with the received quality of a channel state information reference signal, through which the mobile station apparatus 2 notifies the base station apparatus 1 of channel state information, and a measurement object to be compared with a threshold.

It is also conceivable to define, as another measurement event, a measurement event to report in the case where the received quality of either one of a channel state information reference signal configured in a measurement object and the channel state information reference signal configured for intercell coordinated communication, which are both set as reference signals in a single measurement object, exceeds/falls below a threshold. That is, comparison of the received quality of a cell used in intercell coordinated communication currently carried out with the received quality of a different cell or comparison of the received quality of a cell used in intercell coordinated communication currently carried out and the received quality of a different cell with a single threshold allows detection of a cell capable of better intercell coordinated communication. In the case where a channel state information reference signal of a cell used in downlink intercell coordinated communication is configured as the channel state information reference signal configured for intercell coordinated communication, the channel state information reference signal of the cell used in downlink intercell coordinated communication is used in addition to a channel state information reference signal as a measurement object in a configuration for a channel state information reference signal to be measured for uplink intercell coordinated communication. The use allows efficient measurement without updating a measurement object with each change in a cell used in intercell coordinated communication or causing a channel state information reference signal configured for intercell coordinated communication and a channel state information reference signal configured in a measurement object to overlap with each other.

In addition to including the channel state information reference signal configured for the intercell coordinated communication described above in reference signals to be measured, measurement may be carried out with the exception of the channel state information reference signal configured for intercell coordinated communication in the case where a reference signal to be measured is included in a configuration for a channel state information reference signal configured in a measurement object. That is, a base station apparatus is assumed to be notified of received quality information of a channel state information reference signal configured for intercell coordinated communication through a different mechanism, and overlapping reports can be prevented by giving a measurement report without including the channel state information reference signal.

The channel state information reference signal configured for intercell coordinated communication (for example, a channel state information reference signal used at the time of notifying, by the mobile station apparatus 2, the base station apparatus 1 of channel state information (CSI) for management of downlink intercell coordinated communication) may be specified in a physical parameter configuration, such as PhysicalConfigDedicated, may be specified in a newly configured parameter configuration (for example, csi-RS-Config-r11), or may be specified in a configuration for channel state information feedback (for example, cqi-ReportConfig). Each channel state information reference signal configured for intercell coordinated communication and each channel state information reference signal configured in a measurement object of a measurement configuration may cause common information elements to have individual pieces of identifier information in order to identify configurations for the channel state information reference signals at the time of a measurement report.

The term "received quality" used in the descriptions of the above first to third embodiments may refer to reference signal received power (RSRP), reference signal received quality (RSRQ), path loss or any other measured value (SIR, SINR, RSSI, or BLER), or a combination of some of these measured values.

The name of each parameter illustrated in the embodiments of the present invention is given for the convenience of description, and a difference between an actually adopted parameter name and a parameter name in the present invention does not affect the spirit of the invention claimed by the present invention.

The embodiments of the present invention have been described above, and a base station apparatus and a mobile station apparatus of the present invention may be controlled in the manner illustrated in each embodiment by recording a program to achieve a function of each unit of the base station apparatus and the mobile station apparatus or a part of these functions in a computer-readable recording medium and loading the program recorded in the recording medium into a computer system for execution. Examples of the "computer system" here include an OS and hardware, such as a peripheral apparatus.

The term "computer-readable recording medium" refers to a portable medium, such as a flexible disk, a magneto-optical disk, a ROM, or a CD-ROM or a storage apparatus, such as a hard disk built in the computer system. Examples of the "computer-readable recording medium" also include one that dynamically retains a program for a short period of time, such as a communication line in the case of transmitting a program via a network like the Internet and a communication line like a telephone line and one that retains a program for a fixed period of time, such as a volatile memory inside the computer system to be a server or a client in that case. Additionally, the program may be one to achieve a part of the functions described earlier or may be one that is capable of achieving the functions described earlier in combination with a program already recorded in the computer system.

Each functional block used in each of the above embodiments may be typically achieved as an LSI, which is an integrated circuit. Each functional block may be fabricated as an individual chip, and some or all of the functional blocks may be fabricated as a chip through integration. Additionally, a method for circuit integration is not limited to LSI and may be achieved by a dedicated circuit or a general purpose processor. Moreover, in the case where a technique for circuit integration substituting for LSI appears thanks to advances in semiconductor technique, it is also possible to use an integrated circuit based on the technique.

Although the embodiments of the present invention have been described above in detail based on the specific examples, it is apparent that the spirit of the present invention and the scope of the claims are not limited to these specific examples. That is, the descriptions herein are illustrative only and are not intended in any way to limit the present invention.

REFERENCE SIGNS LIST 1 base station apparatus
2 mobile station apparatus
101, 201 reception unit
102, 202 demodulation unit
103, 203 decoding unit
104, 205 control unit
105, 207 coding unit
106, 208 modulation unit
107, 209 transmission unit
108 network signal transmission and reception unit
109, 210 higher layer
204 measurement unit
206 random access processing unit

The invention claimed is:
1. A communication system comprising:
a mobile station apparatus; and a base station apparatus configured to notify the mobile station apparatus of a measurement configuration specifying measurement using a reference signal, wherein the measurement configuration includes a measurement object indicating at least a frequency serving as an object to be measured and respective configurations for a plurality of channel state information reference signals to be measured, and a report configuration specifying a condition for a measurement report, the base station apparatus is further configured to include in the measurement configuration, for each of the respective configurations for the plurality of channel state information reference signals, a corresponding first measurement offset to offset a result of measurement using the plurality of channel state information reference signals in the measurement configuration, and to include a second measurement offset applicable to each of a plurality of cells in the measurement configuration, and to notify the mobile station apparatus of the measurement configuration, and the mobile station apparatus is configured to add the respective first measurement offset to a respective result of measuring each of the plurality of channel state information reference signals and not to add the second measurement offset to the respective result to judge whether the condition is satisfied, the judgement being performed in a case where cell identifier information for the respective configurations for the plurality of channel state information reference signals are clearly notified, and in a case where the first measurement offset is included in the measurement configuration for the respective configurations for the plurality of channel state information reference signals, and the second measurement offset is included in the measurement configuration.

2. The communication system according to claim 1, wherein the base station apparatus is configured to classify the respective configurations for the plurality of channel state information reference signals into one or more groups and include information, which allows identification of one among the one or more groups, in the measurement configuration to notify the mobile station apparatus of the measurement configuration, and the mobile station apparatus is configured to carry out measurement using the plurality of channel state information reference signals of the one or more groups associated with the report configuration.

3. A mobile station apparatus comprising:

reception circuitry configured to receive, from a base station apparatus, a measurement configuration specifying measurement using a reference signal; and control circuitry, wherein the measurement configuration includes a measurement object indicating at least a frequency serving as an object to be measured and respective configurations for a plurality of channel state information reference signals to be measured, and a report configuration specifying a condition for a measurement report, the measurement configuration further includes, for each of the respective configurations for the plurality of channel state information reference signals, a corresponding first measurement offset to offset a result of measurement using the plurality of channel state information reference signals, the measurement configuration further includes a second measurement offset applicable to each of a plurality of cells, and the control circuitry is configured to add the respective first measurement offset to a respective result of measuring each of the plurality of channel state information reference signals and not to add the second measurement offset to the respective result to judge whether the condition is satisfied, the judgement being performed in a case where cell identifier information for the respective configurations for the plurality of channel state information reference signals are clearly notified, and in a case where the first measurement offset is included in the measurement configuration for the respective configurations for the plurality of channel state information reference signals, and the second measurement offset is included in the measurement configuration.

4. The mobile station apparatus according to claim 3, wherein the measurement configuration further has one or more groups, into which the respective configurations for the plurality of channel state information reference signals are classified, and includes information, which allows identification of one among the one or more groups, and the control circuitry is configured to carry out measurement using the plurality of channel state information reference signals of the one or more groups associated with the report configuration.

5. A measurement method for a mobile station apparatus to receive, from a base station apparatus, a measurement configuration specifying measurement using a reference signal, wherein the measurement configuration includes a measurement object indicating at least a frequency serving as an object to be measured and respective configurations for a plurality of channel state information reference signals to be measured, and a report configuration specifying a condition for a measurement report, the measurement configuration further includes, for each of the respective configurations for the plurality of channel state information reference signals, a corresponding first measurement offset to offset a result of measurement using the plurality of channel state information reference signals, the measurement configuration further includes a second measurement offset applicable to each of a plurality of cells, and the measurement method includes the step of adding the respective first measurement offset to a respective result of measuring each of the plurality of channel state information reference signals and not adding the second measurement offset to the respective result and judging whether the condition is satisfied, the judgement being performed in a case where cell identifier information for the respective configurations for the plurality of channel state information reference signals are clearly notified, and in a case where the first measurement offset is included in the measurement configuration for the respective configurations for the plurality of channel state information reference signals, and the second measurement offset is included in the measurement configuration.

6. The measurement method according to claim 5, wherein the measurement configuration further has one or more groups, into which the respective configurations for the plurality of channel state information reference signals are classified, and includes information, which allows identification of one among the one or more groups, and the measurement method includes the step of carrying out measurement using the plurality of channel state information reference signals of the one or more groups associated with the report configuration.

7. An integrated circuit to be mounted in a mobile station apparatus, the integrated circuit comprising:

reception circuitry configured to receive, from a base station apparatus, a measurement configuration specifying measurement using a reference signal; and control circuitry, wherein the measurement configuration includes a measurement object indicating at least a frequency serving as an object to be measured and respective configurations for a plurality of channel state information reference signals to be measured, and a report configuration specifying a condition for a measurement report, the measurement configuration further includes, for each of the respective configurations for the plurality of channel state information reference signals, a corresponding first measurement offset to offset a result of measurement using the plurality of channel state information reference signals, the measurement configuration further includes a second measurement offset applicable to each of a plurality of cells, and the control circuitry is configured to include a function of adding the respective first measurement offset to a respective result of measuring each of the plurality of channel state information reference signals and not adding the second measurement offset to the respective result and judging whether the condition is satisfied, the judgement being performed in a case where cell identifier information for the respective configurations for the plurality of channel state information reference signals are clearly notified, and in a case where the first measurement offset is included in the measurement configuration for the respective configurations for the plurality of channel state information reference signals, and the second measurement offset is included in the measurement configuration.

8. The integrated circuit according to claim 7, wherein the measurement configuration further has one or more groups, into which the respective configurations for the plurality of channel state information reference signals are classified, and includes information, which allows identification of one among the one or more groups, and the control circuitry is configured to include a function of carrying out measurement using the plurality of channel state information reference signals of the one or more groups associated with the report configuration.

* * * * *